(12) United States Patent
Iwasa et al.

(10) Patent No.: US 7,687,133 B2
(45) Date of Patent: Mar. 30, 2010

(54) WEATHER STRIP

(75) Inventors: Norimasa Iwasa, Aichi-ken (JP);
Masanori Aritake, Aichi-ken (JP);
Satoshi Toki, Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 215 days.

(21) Appl. No.: 11/878,137

(22) Filed: Jul. 20, 2007

(65) Prior Publication Data
US 2008/0026196 A1 Jan. 31, 2008

(30) Foreign Application Priority Data
Jul. 26, 2006 (JP) .................... P-2006-203409

(51) Int. Cl.
*B32B 3/02* (2006.01)
*B32B 3/26* (2006.01)
(52) U.S. Cl. .................... 428/122; 49/490.1; 49/498.1; 428/600
(58) Field of Classification Search .................. 428/122, 428/600; 49/490.1, 498.1; 277/651, 921
See application file for complete search history.

(56) References Cited

U.S. PATENT DOCUMENTS

| 4,188,424 | A | 2/1980 | Ohno et al. |
| 4,333,221 | A | 6/1982 | Hayashi |
| 4,430,374 | A | 2/1984 | Ezaki |
| 5,783,312 | A | 7/1998 | Laughman et al. |
| 6,684,574 | B2 | 2/2004 | Hayashi |
| 6,935,072 | B2 | 8/2005 | Kogiso et al. |
| 7,097,180 | B2 | 8/2006 | Kuzuya et al. |
| 2003/0082337 | A1 | 5/2003 | Mizuno et al. |
| 2006/0121241 | A1 | 6/2006 | Bonds |

FOREIGN PATENT DOCUMENTS

JP 11-48879 2/1999

OTHER PUBLICATIONS

European Search Report dated Jul. 16, 2008.

*Primary Examiner*—Alexander Thomas
(74) *Attorney, Agent, or Firm*—McGinn IP Law Group PLLC

(57) ABSTRACT

A weather strip has a trim portion and a seal portion. The trim portion has a vehicle interior side wall, a vehicle exterior side wall, and a connecting portion. A metal insert is embedded in the trim portion. The insert has piece portions and a center bond portion which connects the piece portions to one another. The thickness of each of parts of the insert, which are other than both curved parts, is set to be thinner than the thickness of each of both the curved parts. Thus, the thickness of the insert, except for the curved parts, is small. Consequently, the entire insert, thus, the entire weather strip can be lightened. On the other hand, both the curved parts are relatively thick. Accordingly, the weather strip can assure predetermined strength and stiffness and can easily maintain an initial shape.

4 Claims, 4 Drawing Sheets

WEATHER STRIP

BACKGROUND OF THE INVENTION

1. Field of the Invention

The present invention relates to a weather strip configured so that an insert is embedded in a trim portion.

2. Related Art

Generally, a weather strip having a trim portion is provided on a flange formed along the peripheral part of a door opening of a vehicle, such as an automobile. The weather strip has a trim portion, which has a holding lip held by being fit into the flange formed along the peripheral part of the door opening, and also has a hollow seal portion provided to protrude from the trim portion. The trim portion has a connecting portion, which connects a vehicle interior side wall, a vehicle exterior side wall, and both side walls, and is substantially-U-shaped in cross section.

Also, a metal insert is embedded in the trim portion. As illustrated in FIG. 8, an insert 90 has a plurality of strip-like piece portions 91 disposed substantially parallel to one another and bond portions 92 (e.g., a center bond portion placed in the connecting portion) that connect the piece portions 91 to one another. Incidentally, FIG. 8 illustrates the insert 90 that is in a state before each of the piece portions 91 is subjected to bending-work and is formed into a substantially U-shape.

When a weather strip is mounted on the flange, the trim portion is fit thereinto. A mounted state, in which the weather strip is mounted thereon, is maintained basically by an elastic force of the holding lip portion or a bonding force of the insert. Additionally, when a door is closed, an edge portion of the door abuts against the seal portion. Thus, the seal portion is crush-deformed to seal between the door and a body of the vehicle.

In recent years, there has been an increasing demand for lightening the weather strip. Because the ratio in weight of the metal insert to the weather strip is high, the weight of the insert is reduced to thereby lighten the weather strip. A technique of lightening the insert is to form the center bond portion to be thin, as compared with the piece portions (see, for example, JP-A-11-48879).

However, according to the above technique, only the center bond portion is formed to be thin. Thus, the weather strip cannot always sufficiently be lightened. On the other hand, when even the piece portions are formed to be thin to fit to the center bond portion, a desired strength (or shape holding performance) cannot be assured. Consequently, the bonding force is insufficient.

SUMMARY OF THE INVENTION

The invention is accomplished to solve the aforementioned problems. An object of the invention is to provide a weather strip enabled to suppress reduction of the strength and the bonding force, while reducing the weight thereof.

Hereinafter, some aspects of the invention suitable for solving the above problems are described by itemizing. Incidentally, if necessary, characteristic operations and advantages are described in addition to the description of an associated one of such aspects of the invention.

(1) a weather strip having a trim portion having a substantially U-shaped cross section which is held by a flange formed along a peripheral part of a door opening of a vehicle and which has a vehicle interior side wall, a vehicle exterior side wall and a connecting portion connecting the vehicle interior side wall and the vehicle exterior side wall, and a hollow seal portion which is provided to protrude from the trim portion and which a peripheral part of a door is pressed against when the door is closed. The trim portion is configured so that a metal insert embedded in the trim portion along a longitudinal direction thereof, and that the insert has a plurality of piece portions disposed substantially parallel to one another and a bond portion configured to connect the piece portions to one another. Each of the piece portions comprises a vehicle interior side wall corresponding part corresponding to the vehicle interior side wall, a vehicle exterior side wall corresponding part corresponding to the vehicle exterior side wall, and a connecting portion corresponding part corresponding to the connecting portion. Each of the piece portions is substantially U-shaped in cross section. Both of a continuously connecting part between the vehicle interior side wall corresponding part and the connecting portion corresponding part and a continuously connecting part between the vehicle exterior side wall corresponding part and the connecting portion corresponding part are curved parts. Thicknesses of the remaining parts of said insert other than said curved parts are smaller than thicknesses of said curved parts of said insert.

According to (1), a predetermined bonding force is given by the metal insert embedded in the trim portion. Thus, the mounted state of the weather strip is maintained. Meanwhile, according to (1), each of the piece portions constituting the insert includes the vehicle interior side wall corresponding part, the vehicle exterior side wall corresponding part, and the connecting portion corresponding part and is substantially U-shaped in cross section. Both of the continuously connecting part between the vehicle interior side wall corresponding part and the connecting portion corresponding part and the continuously connecting part between the vehicle exterior side wall corresponding part and the connecting portion corresponding part are curved parts. Additionally, as compared with thicknesses of both the curved parts of the insert, thicknesses of the remaining parts of the insert other than both the curved parts are set to be small. Thus, the weather strip other than both the curved parts is formed to be thin. Accordingly, the entire insert, thus, the entire weather strip can be lightened. On the other hand, because the insert is not entirely thinned so that both of the curved parts are relatively thick, predetermined strength and stiffness can be ensured, so that the initial shape at the bending can easily be maintained. Consequently, a situation, in which the bonding force is insufficient, can be restrained from occurring. Thus, the mounted state can be stabilized. This enables the seal portion to exert sealing performance over a long period of time.

Incidentally, from a viewpoint of realizing sufficiently light weight and achieving a predetermined strength as compared with the conventional weather strip, it is more preferable that the insert is formed of a cold rolled steel sheet (SPCC), that the thickness of both the curved parts is 0.5 mm±0.04 mm, and that the thickness of the remaining parts other than both the curved parts is 0.4 mm±0.04 mm.

(2) A weather strip according to (1), which is configured so that a thickness of the remaining parts other than both the curved parts is thinner by 0.05 mm or more than a thickness of each of the curved parts.

In a case where a weather strip is configured like (2) so that the thickness of the remaining parts thereof other than both the curved parts is thinner by 0.05 mm or more than the thickness of both of the curved parts, the weather strip can obtain two opposite advantages at a time, that is, the weather strip can be lightened, while the weather strip can have the predetermined strength. Incidentally, the weather strip can be configured so that the thickness of the remaining parts thereof other than both the curved parts is thinner by 0.08 mm or more than the thickness of each of the curved parts.

(3) A weather strip according to (1), which is configured so that the insert is made of a cold rolled steel sheet (e.g., SPCC-4D) and is formed by being extended by applying pressure thereto from rolling mill rollers.

According to (3), an insert configured to change a thickness according to the position of a part thereof, at which the thickness is measured, can be relatively stably obtained. That is, generally, an insert is manufactured by extending a plate-like material by applying pressure thereto using rolling mill rollers. However, in this case, it is necessary to provide a difference in thickness between a part, which corresponds to each of both the curved parts, and each of the remaining parts other than both the curved parts. Regarding this respect, a predetermined step-like part is formed on the surface of the rolling mill roller. Then, a rolling process is performed on the plate-like material. Consequently, the above-described insert can accurately and stably be obtained with a relatively simple configuration.

(4) A weather strip according to (1), which is configured so that an end part of at least one of said vehicle interior side wall corresponding part and said vehicle exterior side wall corresponding part is cut off at predetermined intervals.

According to (4), an end part of at least one of the vehicle interior side wall corresponding part and the vehicle exterior side wall corresponding part is cut off at predetermined intervals. Thus, the weather strip can be further lightened. On the other hand, objects to be cut are end parts of the vehicle interior side wall corresponding part and the vehicle exterior side wall corresponding part. Additionally, the end parts are cut at the predetermined intervals (e.g., every two end parts or every three end parts). This does not much affect the strength and the stiffness.

DETAILED DESCRIPTION OF THE PREFERRED EMBODIMENTS

Hereinafter, an embodiment of the invention is described in detail with reference to the accompanying drawings.

Figure 2:
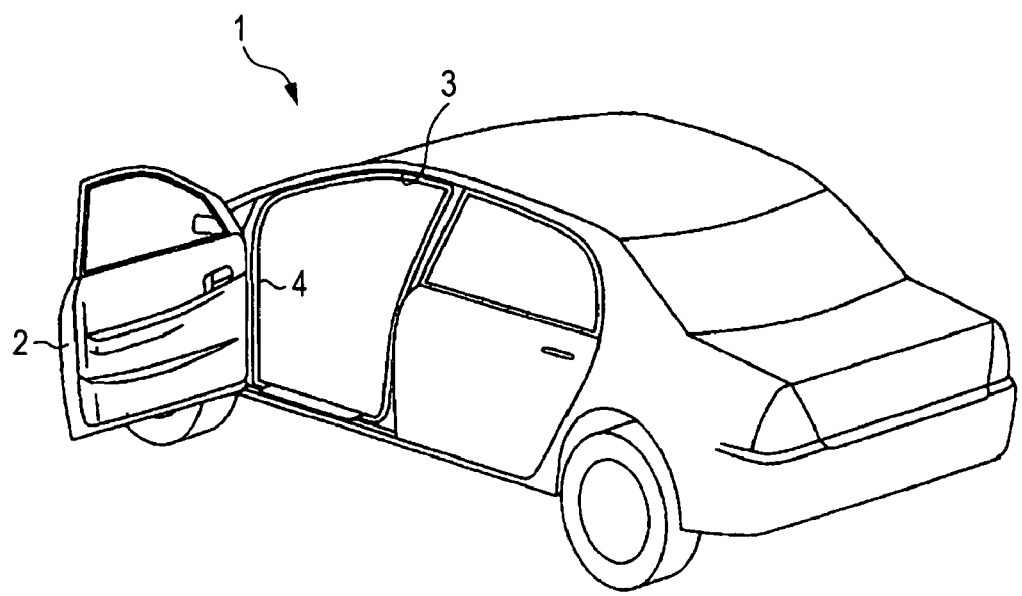
FIG. 2 is a perspective view illustrating the automobile.

As illustrated in FIG. 2, a weather strip 4 is provided on a peripheral part of a body-side door opening 3 corresponding to a side door 2 of an automobile 1. The weather strip 4 according to the present embodiment is mounted on the peripheral part of the door opening 3 other than a lower part thereof. The entire weather strip 4 is formed by extrusion-molding.

Figure 1:
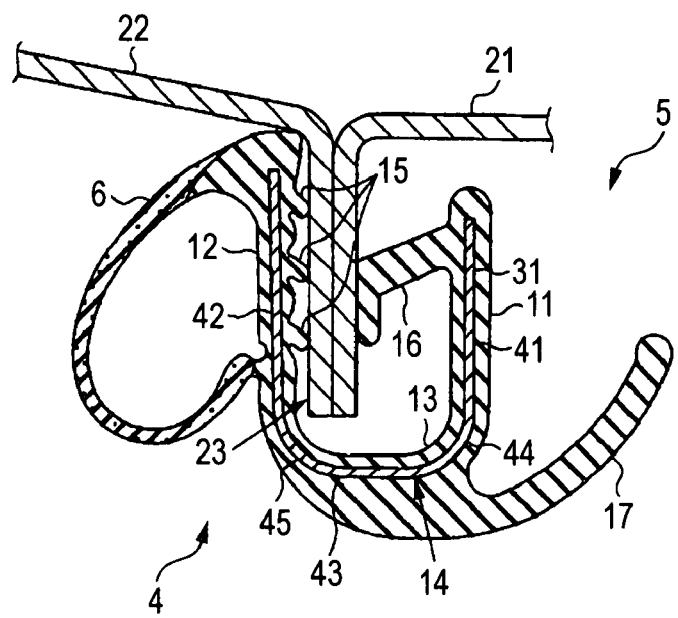
FIG. 1 is a cross-sectional view illustrating a weather strip according to an embodiment of the invention.

As shown in FIG. 1, the weather strip 4 has a trim portion 5 and a seal portion 6. The trim portion 5 has a vehicle interior side wall 11, a vehicle exterior side wall 12, and a curved-cross section connecting portion 13 connecting both the side walls 11 and 12. The trim portion 5 is substantially U-shaped in cross section, as a whole. The trim portion 5 is made of EPDM (ethylene-propylene-diene-copolymer) solid rubber. A metal insert 14 (in the present embodiment, the insert 14 is made of a cold rolled steel sheet (e.g., SPCC-4D)) is embedded in the trim portion 5.

A plurality of holding lip portions 15 extending toward the inside (i.e., the vehicle interior side in the direction of width of the vehicle) of the trim portion 5 are integrally formed on the inner surface of the vehicle exterior side wall 12. A holding lip portion 16 extending toward the inside (i.e., the vehicle exterior side in the direction of width of the vehicle) of the trim portion 5 is formed on the inner surface of the vehicle interior side wall 11 integrally therewith. Also, a cover lip 17 used to cover end portions of interior parts (not shown), such as a garnish, is formed integrally with the connecting portion 13.

Also, the seal portion 6 is provided on the vehicle exterior side wall 12 to protrude therefrom to the vehicle exterior side. The seal portion 6 is made of EPDM sponge rubber. Incidentally, the seal portion 6 may be made mainly of EPDM sponge rubber so that coating-film made of EPDM solid rubber is formed on a surface layer side. Additionally, when the door 2 is closed, the seal portion 6 is crush-deformed to seal between the door 2 and the body of the automobile 1.

The weather strip 4 is mounted on the peripheral part of the body-side door opening 3 (see FIG. 2) by fitting the trim portion 5 into the door opening 3. More specifically, as illustrated in FIG. 1, the body has an inner panel 21 and an outer panel 22. Basically, a flange 23 is formed by joining peripheral part portions of both the panels 21 and 22 to each other (apparently, a plate-like reinforcement can be provided between both the panels 21 and 22 so as to increase the strength). Then, the trim portion 5 is fit into the flange 23. Basically, the mounted state of the weather strip is maintained by the elastic forces of the holding lips 15 and 16 or the bonding force of the insert 14.

Figure 3:
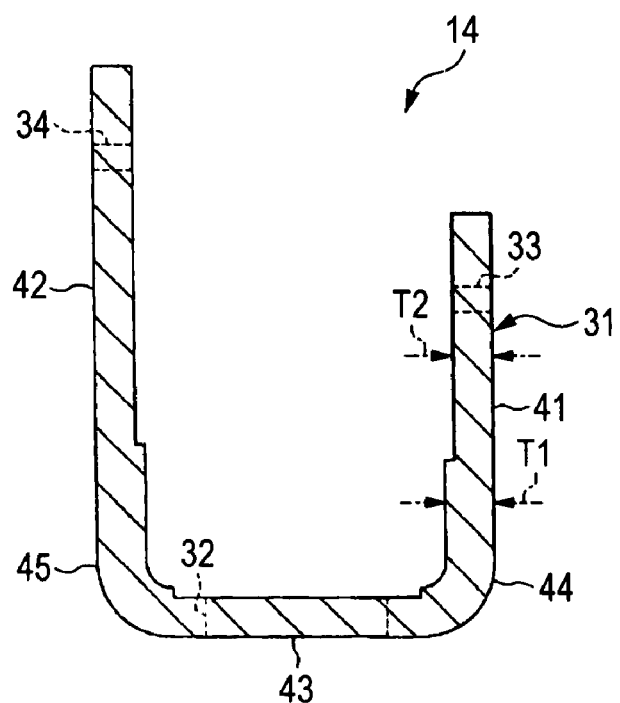
FIG. 3 is a cross-sectional view illustrating an insert.
Figure 4:
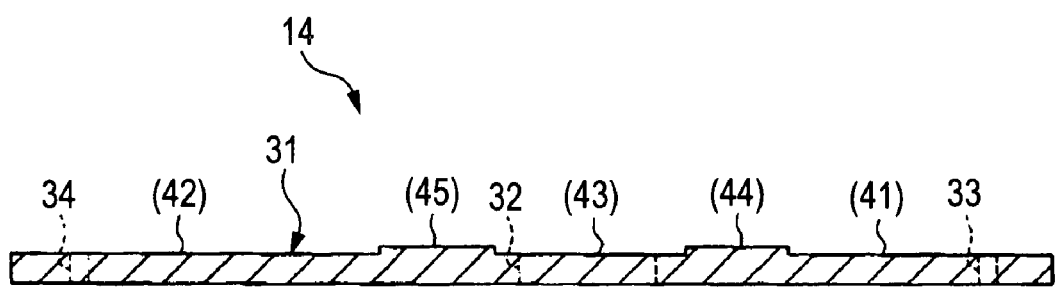
FIG. 4 is a cross-sectional view illustrating the insert which is in a state before subjected to bending-work.
Figure 5:
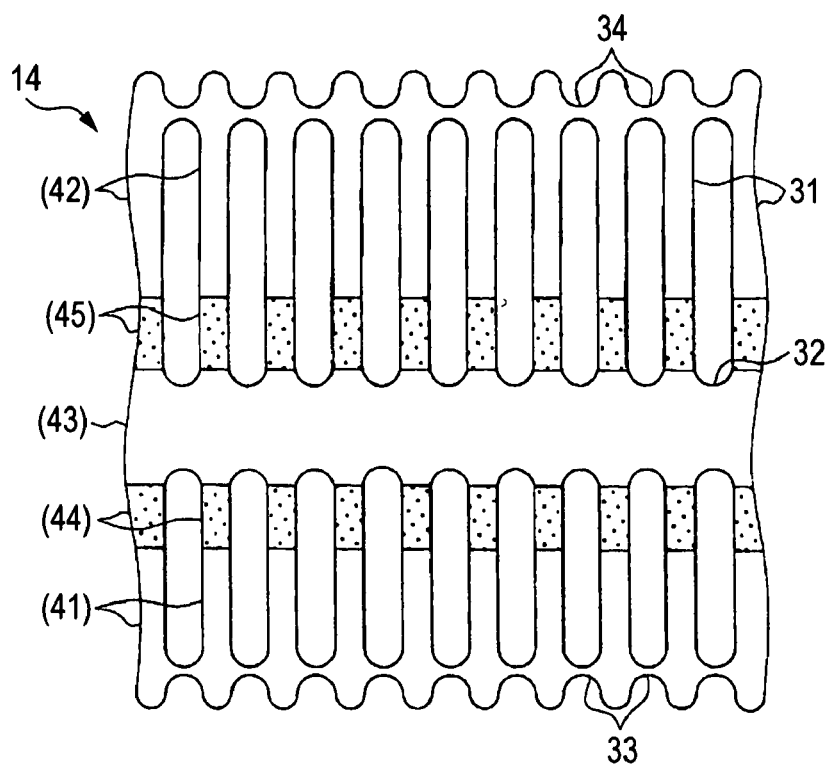
FIG. 5 is a partial plan view illustrating the insert which is in the state before subjected to bending-work.

Inserts of the center bond type shown in FIGS. 3, 4, and 5 are used as the insert 14 in the present embodiment (FIGS. 4 and 5 illustrate a state before the insert is subjected to bending-work). That is, the insert 14 has a plurality of strip-like piece portions 31 disposed substantially parallel to one another, a center bond portion 32 connecting the piece portions 31 to one another substantially at the central portion, and side bond portions 33 and 34 connected to each other substantially at both end portions thereof.

Then, the piece portions 31 are embedded at predetermined intervals along a longitudinal direction of the trim portion 5 and are bent, together with the trim portion 5, substantially like a letter "U" in the bending-work after the extrusion-molding. On the other hand, the center bond portion 32 is embedded continuously along the longitudinal direction of the trim portion 5 to be placed nearly in the central portion. Also, the side bond portions 33 and 34 are embedded continuously along the longitudinal direction of the trim portion 5 to be placed at end portions of the vehicle interior side wall 11 and the vehicle exterior side wall 12, respectively. Incidentally, the side bond portions 33 and 34 are cut off by repeating the bending-work after the trim portion 5 is bent substantially like a letter "U". Thus, each pair of the adjacent piece portions 31 can be spread and separated from each other. A reason for connecting the side bond portions 33 and 34 to each other at the extrusion-molding is that the insert 14 is linearly fed. A reason for cutting the side bond portions 33 and 34 after subjected to the bending-work is that the mountability of the trim portion 5 by bending is enhanced. Thus, in the present embodiment, the center bond portion 32 corresponds to the "bond portion".

It has been described that the piece portions 31 are bent, together with the trim portion 5, substantially like a letter "U". That is, each of the piece portions 31 has a vehicle interior side wall corresponding part 41 corresponding to the vehicle interior side wall 11, a vehicle exterior side wall corresponding part 42 corresponding to the vehicle exterior side wall 12, and a connecting portion corresponding part 43 corresponding to the connecting portion 13. Each of the piece portions 31 is substantially U-shaped in cross section through the bending-work. A continuously connecting part between the vehicle interior side wall corresponding part 41 and the connecting portion corresponding part 43 and a continuously connecting part between the vehicle exterior side wall corresponding part 42 and the connecting portion corresponding part 43 are the curved parts 44 and 45, respectively. Additionally, in the case of the present embodiment, as compared with the thickness of each of both the curved parts 44 and 45 (parts designated by dot patterns in FIG. 5), the thickness of each of the remaining parts except for both the curved parts 44 and 45 is thin.

More specifically, the thickness T1 of each of both the curved parts 44 and 45 is 0.5 mm, while the thickness T2 of each of the remaining parts (including the center bond portion 32 and the side bond portions 33 and 34) other than the curved parts 44 and 45 is 0.4 mm.

For example, such an insert 14 is obtained as follows. First, in a process of reversely feeding a thin-sheet-like cold rolled steel sheet (SPCC-4D) along the longitudinal direction, cuts (or slits) are formed therein. The steel sheet, in which the cuts are formed, is guided to a group of paired upper and lower rolling mill rollers. The group of rolling mill rollers is used to make the steel sheet thin and to evenly draw out the thin steel sheet. The steel sheet passed through the rolling mill rollers is drawn out at the cuts and is formed into a shape, in which the piece portions 31 are separated from one another, as illustrated in FIG. 5. Consequently, a plurality of strip-like piece portions 31 are formed at predetermined intervals.

Figure 6:
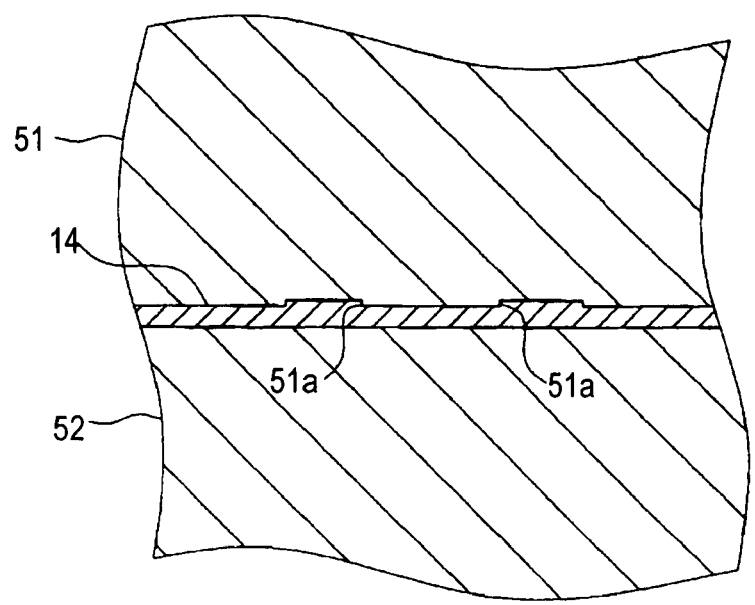
FIG. 6 is an enlarged schematic cross-sectional view illustrating rollers used when extending the insert by applying pressure thereto.

FIG. 6 is a schematic cross-sectional view illustrating an example of the rolling mill rollers. As illustrated in FIG. 6, the rolling mill rollers include an upper roller 51 and a lower roller 52. An outer peripheral surface of the lower roller 52 is shaped flat, while a step-like part 51a is formed on the upper roller 51. Additionally, the aforementioned difference in thickness is provided by the step-like part 51a. That is, parts, in each of which the gap between both the rollers 51 and 52 is relatively large, (corresponding to the curved parts 44 and 45) are formed to be relatively thick. The remaining parts, in which the gap between both the rollers 51 and 52 is relatively small, are formed to be relatively thin.

Incidentally, the weather strip 4 according to the present embodiment are manufactured through an extrusion step, a vulcanization step, a bending step, and a cutting step. That is, in the extrusion step, unvulcanized rubber is extruded while the flat-sheet-like insert 14, which has been extended by applying pressure thereto, is continuously supplied from a shaped hole formed in a die (not shown) constituting an extruder. At that time, the part corresponding to the trim portion 5 is extruded in a state in which both end portions of this part are spread like a flat sheet or substantially like a letter "V".

Subsequently, the extruded unvulcanized rubber is continuously guided into a vulcanizer (or a heating zone (not shown)), in which vulcanization is performed on the unvulcanized rubber.

Further, a vulcanized precursor of the weather strip 4 is guided to a bending-work apparatus (not shown). Then, the bending-work of the precursor is performed so that both end portions of the part corresponding to the trim portion 5 are narrowed. Consequently, a trim portion 5 having a substantially-U-shaped cross section is formed. At that time, as described above, the bending-work of the insert 14 is performed. Thus, the aforementioned curved parts 44 and 45 are formed. Subsequently, the insert 14 is passed through an insert separator (not shown), so that the aforementioned side bond portions 33 and 34 are separated therefrom. Then, the insert 14 is cut at a cutter (not shown) into parts which have a predetermined length. Consequently, the aforementioned weather strip 4 is obtained.

As described in detail, according to the present embodiment, as compared with the thickness T1 of each of both the curved parts 44 and 45 of the insert 14, the thickness T2 of each of the remaining parts except for both the curved parts 44 and 45 is thin. The entire insert 14, thus, the entire weather strip 4 can be lightened by reducing the thickness of the insert 14, except for both the curved parts 44 and 45 (T2=0.4 mm). On the other hand, instead of reducing the entire insert 14, both the curved parts 44 and 45 are relatively thick (T1=0.5 mm). Thus, the predetermined strength and the stiffness can be assured.

Particularly, the thickness T2 of the remaining parts thereof other than both the curved parts is thinner by 0.05 mm or more (0.1 mm in the present embodiment) than the thickness of both of the curved parts 44 and 45, the weather strip can obtain two opposite advantages at a time, that is, the weather strip can be lightened, while the weather strip can have the predetermined strength.

Also, the insert 14 is made of a cold rolled steel sheet (e.g., SPCC-4D) and is formed by extending the cold rolled steel sheet by applying pressure thereto using the group of the rolling mill rollers (e.g., the upper and lower rollers 51 and 52). Thus, an insert configured to change a thickness according to the position of a part thereof, at which the thickness is measured, can be relatively stably obtained without high cost. That is, according to the present embodiment, the insert 14 is manufactured by extending a plate-like material by applying pressure thereto using the rolling mill rollers. In this case, it is necessary to provide a difference in thickness between a part, which corresponds to each of both the curved parts 44 and 45, and each of the remaining parts other than both the curved parts 44 and 45. Regarding this respect, as described above, a predetermined step-like part 51a is formed on the surface of the upper roller 51. Then, a rolling process is performed on the plate-like material. Consequently, the above-described insert 14 can accurately and stably be obtained with a relatively simple configuration.

Incidentally, the invention is not limited to the embodiments described in the foregoing description. For example, the invention can be carried out as follows. Apparently, other applications and alterations of the invention, which are not exemplified in the following description, can be made.

Figure 7:
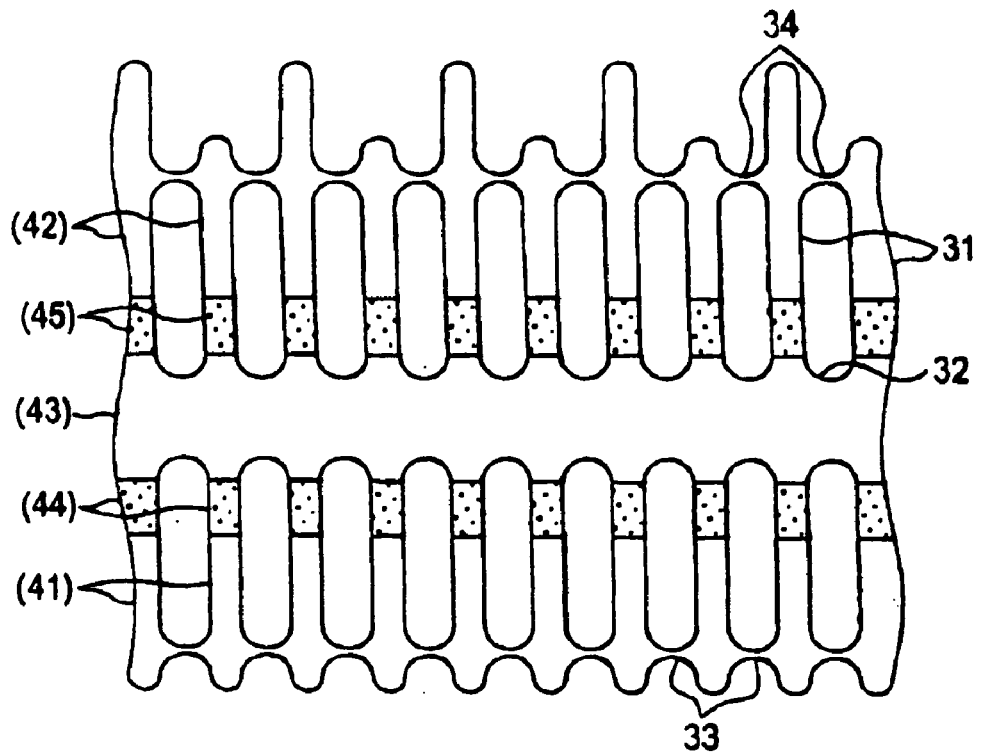
FIG. 7 is a plan view illustrating an insert according to another embodiment, which is in a state before subjected to bending-work.
Figure 8:
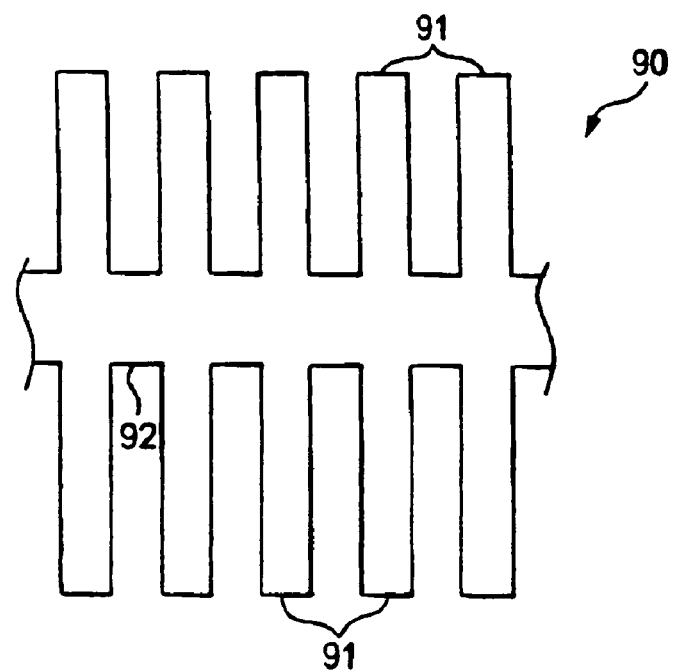
FIG. 8 is a partial plan view illustrating a conventional insert that is in a state before subjected to bending-work.

(a) Although not particularly referred to in the foregoing description, end portions of at least one kind of the vehicle interior side wall corresponding parts 41 and the vehicle exterior side wall corresponding parts 42 are cut off at predetermined intervals. For example, as illustrated in FIG. 7, the end portions of the vehicle exterior side wall corresponding parts 42 may be cut off every two end portions. The weather strip can be further lightened by cutting the end portions in such a manner. On the other hand, objects to be cut are end portions of the vehicle interior side wall corresponding parts 41 and the vehicle exterior side wall corresponding parts 42. Additionally, the end parts are cut at the predetermined intervals (e.g., every two end portions). This does not much affect the strength and the stiffness.

(b) The aforementioned embodiments are configured to have the side bond portions 33 and 34 configured to connect the piece portions 31 substantially at both end parts, in addition to the center bond portion 23. However, at least one kind of the side bond portions 33 and 34 can be omitted. Therefore, even in a case where the insert is, for example, of the type configured so that the piece portions 31 are connected to one another only by the center bond portion 32, there is no inconvenience. Also, the insert can be, for example, of the type configured so that the piece portions 31 are connected to one another only by the side bond portions 33 and 34.

(c) The aforementioned embodiments are configured so that the insert 14 is obtained by passing the cold rolled steel sheet through the rolling mill rollers. However, the insert can be obtained by preliminarily providing a difference in thickness in the steel sheet and performing punching.

(d) According to the aforementioned present embodiments, the weather strip 4 provided along the peripheral part of the body-side door opening 3 corresponding to the (side front) door 2 is implemented. However, the invention can be applied to weather strips provided along the peripheral parts of the door openings of other doors, such as a rear door, a back door, a luggage door (or trunk lid), and a roof door (or sliding roof panel).

(e) According to the aforementioned embodiments, the trim portion 5 is made of solid rubber, while the seal portion 6 is made of sponge rubber. However, both the trim portion 5 and the seal portion 6 can be made of the same material. Additionally, the trim portion 5 can be made of microfoam rubber. Although EPDM is exemplified in the foregoing description as the rubber material, other rubber materials, such as IR (isoprene rubber) and CR (chloroprene rubber), can be employed. Additionally, thermoplastic elastomers, such as olefin, and resin materials, such as soft PVC (polyvinyl chloride), can be employed in addition to resin materials.

(f) The aforementioned embodiments are configured so that the weather strip 4 is mounted substantially over the entire peripheral part of the door opening 3 except for the lower part thereof. However, the weather strip can be mounted over the complete peripheral part. Additionally, a weather strip mounted partly on the peripheral part of door opening 3, instead of the weather strip mounted on the complete peripheral part and the weather strip mounted substantially on the entire peripheral part.

What is claimed is:

1. A weather strip comprising:
    a trim portion having substantially U-shaped cross section which is to be held by a flange formed along a peripheral part of a door opening of a vehicle and which has a vehicle interior side wall, a vehicle exterior side wall and a connecting portion connecting said vehicle interior side wall and said vehicle exterior side wall; and
    a hollow seal portion which is provided to protrude from said trim portion and which a peripheral part of a door is pressed against when said door is closed,
    said trim portion being configured so that a metal insert is embedded in said trim portion along a longitudinal direction thereof, and that said insert has a plurality of piece portions disposed substantially parallel to one another and a bond portion configured to connect said piece portions to one another,
    wherein each of said piece portions comprises a vehicle interior side wall corresponding part corresponding to said vehicle interior side wall, a vehicle exterior side wall corresponding part corresponding to said vehicle exterior side wall, and a connecting portion corresponding part corresponding to said connecting portion and is substantially U-shaped in cross section, so that a continuously connecting part between said vehicle interior side wall corresponding part and said connecting portion corresponding part and a continuously connecting part between said vehicle exterior side wall corresponding part and said connecting portion corresponding part are curved parts; and
    thicknesses of the remaining parts of said insert other than said curved parts are smaller than thicknesses of said curved parts of said insert.

2. A weather strip according to claim 1, wherein a thickness of said remaining parts other than both said curved parts is thinner by 0.05 mm or more than a thickness of each of said curved parts.

3. A weather strip according to claim 1, wherein said insert comprises a cold rolled steel sheet and is formed by being extended by applying pressure thereto from rolling mill rollers.

4. A weather strip according to claim 1, wherein an end part of at least one of said vehicle interior side wall corresponding part and said vehicle exterior side wall corresponding part is cut off at predetermined intervals.

\* \* \* \* \*